United States Patent [19]

Brownell et al.

[11] 4,317,953
[45] Mar. 2, 1982

[54] STRAIN RELIEF FOR CABLE SPLICE CLOSURES

[75] Inventors: Kenneth W. Brownell; Virgil Bolick, both of Asheville; Joseph Carswell, Leicester; Robert C. Hazenfield, Asheville, all of N.C.

[73] Assignee: Akzona Incorporated, Asheville, N.C.

[21] Appl. No.: 140,513

[22] Filed: Apr. 14, 1980

[51] Int. Cl.³ .......................................... H02G 15/10
[52] U.S. Cl. .............................. 174/21 R; 174/88 R; 339/105; 339/107
[58] Field of Search ................. 174/21 R, 84 R, 84 S, 174/88 R, 91, 92, 93, 135; 339/103 R, 103 C, 105, 107

[56] References Cited

U.S. PATENT DOCUMENTS

| | | |
|---|---|---|
| 1,949,846 | 3/1934 | Slotsky . |
| 3,148,241 | 9/1964 | Moore .................................. 174/92 |
| 3,223,958 | 12/1965 | Prohl .......................... 339/103 R X |
| 3,290,064 | 12/1966 | Bush ................................. 174/92 X |

FOREIGN PATENT DOCUMENTS

| | | |
|---|---|---|
| 1938927 | 2/1971 | Fed. Rep. of Germany ...... 174/135 |
| 357909 | 11/1905 | France . |
| 2131409 | 10/1972 | France . |
| 1551298 | 8/1979 | United Kingdom . |

Primary Examiner—C. L. Albritton
Assistant Examiner—D. A. Tone
Attorney, Agent, or Firm—Francis W. Young; David M. Carter

[57] ABSTRACT

There is provided an electrical cable splice assembly, including a splice case having two ports for receiving a pair of cable ends. The conductors within the cable are adapted to be spliced together inside the splice closure. A pair of cable clamping devices are each firmly attached to each cable a certain distance removed from the splice closure. A rigid member, having a pair of rigid arms, attaches the cable clamping devices directly to one another so that any strain applied on one cable is transferred to the other and the splices within the splice closure do not feel the effects of the strain. There is further provided a clamping ring attached to the assembly for receiving a rod to be buried in the ground such that the height of the assembly with respect to the ground can be varied during installation.

10 Claims, 5 Drawing Figures

STRAIN RELIEF FOR CABLE SPLICE CLOSURES

BACKGROUND OF THE INVENTION

This invention relates to cable splice assemblies. More particularly, it relates to an improved cable strain relief for cable splice assemblies.

In field installation of telephone cable, it is often necessary to splice the ends of the cable together. The actual splice connections are made between the ends of the corresponding communication conductors within each cable. A portion of the jacket and shield are removed from the ends of each cable to be spliced and the conductors are exposed. In order to avoid corrosion of the conductors and other hazards, it is necessary to enclose the spliced conductors with a cable splice closure. A cable splice closure quite often is made of a metal or plastic material having two halves which are clamped together. An example of such a splice closure is shown in U.S. Pat. No. 3,982,319 issued to Bice. The Bice patent also shows a clamp which squeezes down on a portion of the splice closure, as well as the outside of the cable, to provide strain relief for the spliced connections within the splice closure. Other state of the art strain reliefs utilize a strain relief bar connected between bonding clips which pierce the cable shield and jacket.

Quite often these splice closures are filled with a jelly-like material which prevents moisture from coming into contact with the actual metallic splices. An alternative approach to this type of jell-filled splice closure is shown in U.S. patent application Ser. No. 69,023, now U.S. Pat. No. 4,283,592, assigned to Akzona Incorporated, assignee of the present invention. In this application, the splice closure is constructed of a container having a top with two holes therein for receiving the respective cables. The box is filled with a heavier-than-water oil, and the splices are submerged within the oil. If moisture does penetrate the box, it would lie on top of the oil and hydrostatic pressure would enhance the contact between the oil and the splice joints. After the construction of this box-oil splice closure as described above, it became apparent that conventional strain relief, such as clamping the ends of the cable directly to the case and/or using a load transfer rod between cable clamps with teeth connecting the cables together for transferring stress between the cables, was not very effective.

OBJECTS OF THE INVENTION

It is one object of this invention to provide an improved strain relief for cable splice assemblies.

It is another object to provide a strain relief assembly which is particularly adapted for use with an oil-filled buried cable splice closure.

It is another object to provide a cable splice assembly having an improved strain relief system, including a mechanism for varying the height above ground so that the splice installer may easily make the splices.

SUMMARY OF THE INVENTION

In accordance with one form of this invention, there is provided a cable splice assembly, including a splice closure having two ports for receiving a pair of cable ends. At least one electrical conductor is included per cable. Each conductor is adapted to be spliced within the splice closure. A pair of cable clamping means are each attached to the respective jacket of each cable at a place removed a certain distance from the closure. A means is provided for rigidly securing the cable clamping means to each other, whereby strain relief is provided for the assembly.

BRIEF DESCRIPTION OF THE DRAWINGS

The subject matter which is regarded as the invention is set forth in the appended claims. The invention itself, however, together with further objects and advantages thereof, can better be understood by reference to the following description taken in conjunction with the accompanying drawings in which:

DESCRIPTION OF THE PREFERRED EMBODIMENT

Figure 1:
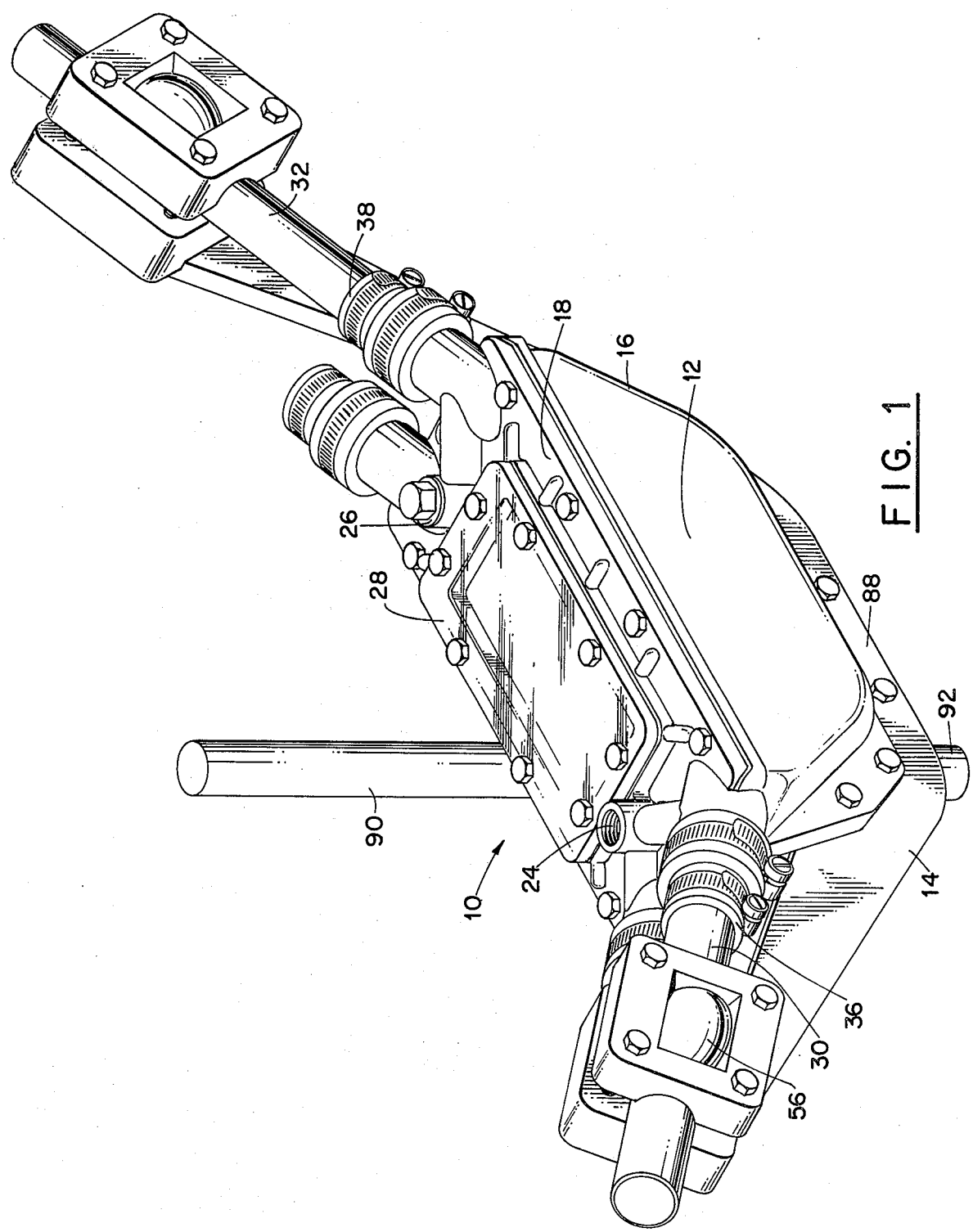
FIG. 1 is a pictorial view of a splice closure assembly, incorporating some of the features of the present invention.

Referring now to FIG. 1, there is provided cable splice assembly 10, including splice closure 12 and a rigid strain relief member 14. Splice closure 12 is described, in part, in more detail in U.S. Pat. No. 4,283,592, issued Aug. 11, 1981, assigned to Akzona Incorporated, assignee of the subject invention and is further shown in U.S. patent application Ser. No. 140,025, filed Apr. 14, 1980 also assigned to Akzona Incorporated.

Figure 2:
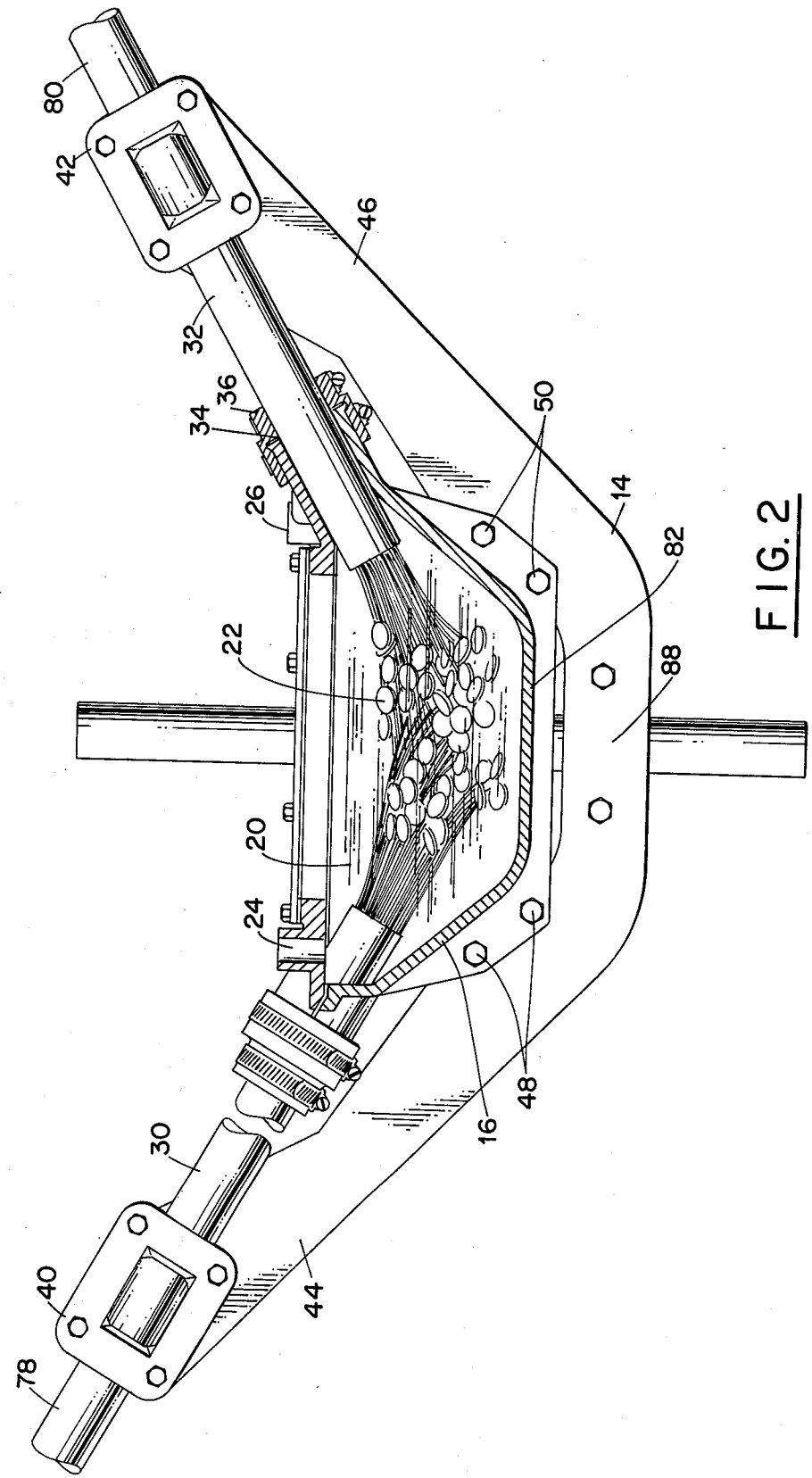
FIG. 2 is a side view of the splice closure assembly of FIG. 1 showing the closure itself in sectional.
Figure 3:
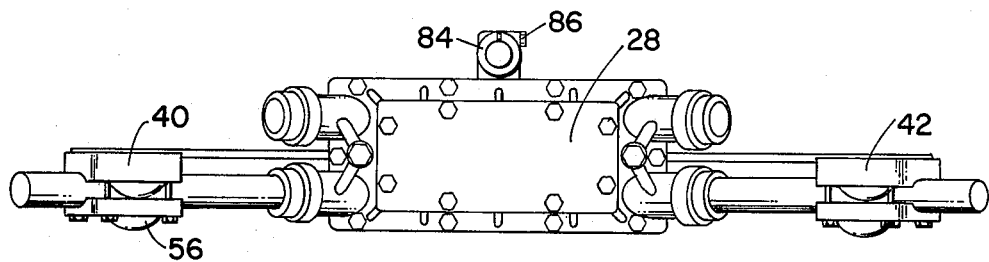
FIG. 3 is a top view of the splice closure assembly of FIG. 1.

The case 12 includes a container or bottom portion 16 and a lid or top portion 18. As can be seen from FIG. 2, the container 6 is substantially filled with a dielectric fluid 20 which substantially surrounds wire splices 22. The fluid is added to the closure through opening 24. Opening 26 acts as a vent while the fluid is being added, to make pouring easier. As can be seen, the top 18 includes a glass window 28 so that the installer can see the fluid level as he pours it into port 24.

Each cable 30 and 32 extend through openings 34 and 36 of the top of the splice closure. Seals 36 and 38 are inserted into openings 34 and 36 and receive the cables 30 and 32 to prevent substantial amounts of moisture from penetrating into the splice closure. Cable 30 and cable 32 are respectively received in cable strain relief clamping members 40 and 42. These clamping members are attached to arms 44 and 46, which make up a part of the rigid strain relief member 14. These arms are secured to the splice closure by means of bolts 48 and 50.

Figure 4:
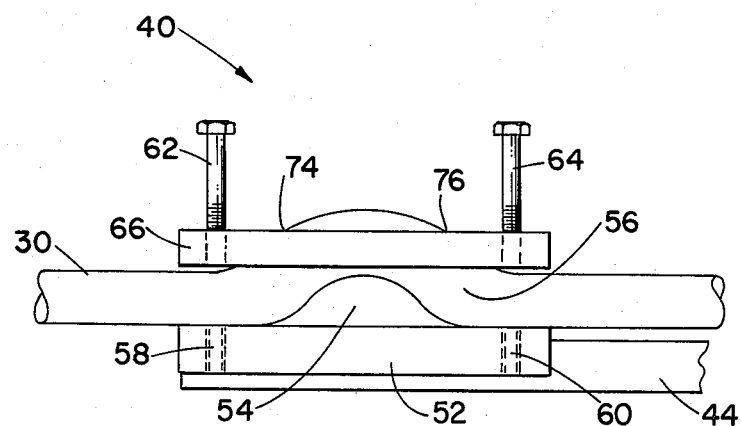
FIG. 4 is a partly exploded view of the cable clamping assembly shown in FIG. 1 with the cable being kinked between the clamps.

The strain relief clamps 40 and 42 may be better understood with reference to FIG. 4. FIG. 4 shows the clamping being prepared to be bolted down onto the cable, and, as such, is not shown to be fastened. The bottom portion of 52 of the clamp is integral with arm 44 of the rigid strain relief member 14. The bottom portion of clamp 52 includes solid raised portion 54, which applies pressure on the cable to place kink 56 in the cable 30. This bottom portion 52 also includes a pair of screw holes 58 and 60 for receiving the bottom portions of bolts 62 and 64. A pair of nuts are adapted to be attached to the bolt for securing the clamp.

Figure 5:
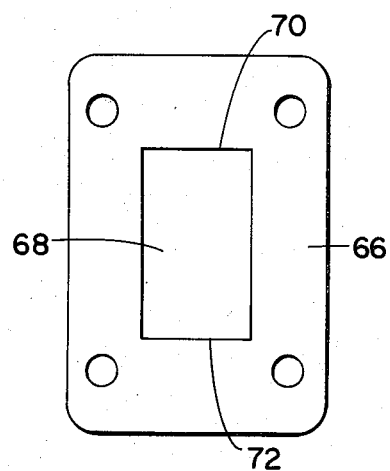
FIG. 5 is a plan view of a part of the strain relief clamp of FIG. 4.

As can be seen from FIG. 5, the top portion 66 of the clamp mechanism includes a cut-out portion 68 for receiving the kinked portion 56 of the cable. The edges 70 and 72 squeeze down upon the sides of the cable at positions 74 and 76 in the jacket to deform the cable core and thereby tightly clamp the cable and keep it from slipping through the clamping device. With this clamp screwed down for both clamping means 40 and 42 and with each clamping means connected integrally with each other through strain relief member 14, any movement of one end of the cable, say end 78, will be readily transferred to the other end of cable 80 by means of this strain relief coupling and clamping mechanism, and thus the splices 22 will not see any effects of this movement of the cable.

Furthermore, this strain relief member 14 is also firmly attached to the splice closure through bolts 48 and 50. Thus, there is no possibility that the cable portion 30 or 32 between the clamps and the splice closure will move further, ensuring that the splices 22 will not come apart due to movement of the assembly itself.

The splice assembly so described is particularly adapted to be installed under the ground, i.e., buried. Furthermore, in one embodiment, it is desirable to fill the splice closure with an oil. Therefore, the position of the splice closure with respect to the ground is very important. That is, the bottom portion 82 should be parallel to the ground so that the oil will not spill out through port holes 34 and 36. Also, since it is to lay in the bottom of a pit in the ground, it could be difficult for the installer, that is the workman who actually does the splicing, to bend over to do this work. Applicant has solved these two problems with the below-described mechanism.

Clamping ring 84 having a screw tightening hose clamp mechanism 86, adapted to vary the circumference of the ring, is attached to the base portion of 88 of the strain relief member 14. Rod 90 is driven into the ground and received by clamping ring 84. While the workman is making the splice in the hole in the ground, the ring in this splice assembly is pulled high on rod 90 so he can easily get to the splices. However, when the splices have been made, the ring screw mechanism 84 is loosened and the assembly is pressed down to the bottom portion 92 of rod 90, then tightened. Thus, the assembly rests on the ground very securely with no danger of the oil 20 leaking out through port holes 34 and 36.

From the foregoing description of the preferred embodiment of the invention, it is apparent that many modifications may be made therein. Thus, it is intended in the appended claims to cover all such modifications that fall within the true spirit and scope of this invention.

We claim:

1. A splice assembly comprising:
a splice closure including a top surface; a pair of openings in said splice closure for receiving a pair of cables, each cable having a jacket and having at least one conductor adapted to be spliced within the closure; a pair of cable clamping means, each firmly attached to the jacket of each cable at some distance removed from said splice closure; a pair of arms rigidly securing said cable clamping means to each other, said arms projecting away from said top surface of said splice closure at an angle greater than 0° from said surface, whereby strain relief is imparted to the splice assembly.

2. A splice assembly as set forth in claim 1, wherein said pair of arms being attached to said splice closure.

3. A splice assembly as set forth in claim 2, wherein said pair of arms projecting away from the top surface of the splice closure at an angle between 180° and 90° with respect to the plane of said top surface of the closure.

4. A splice assembly as set forth in claim 1, further including a kink in each cable within said clamping means.

5. A splice assembly as set forth in claim 4, wherein each clamping means includes two pieces, one of said pieces having a raised portion for engaging and kinking said cable and the other piece including an opening for receiving said kinked portion, each of said pieces being securely fastened together.

6. A splice assembly as set forth in claim 1, further including means for securing said closure to the ground and holding said closure in a substantially fixed position so that the contents of said closure will not spill easily.

7. A splice assembly as set forth in claim 6, further including means to vary the elevation of said closure with respect to the ground.

8. A splice assembly as set forth in claim 7, wherein said means to vary includes a ring attached to said means for rigidly securing, said ring adapted to receive a rod which is to be driven into the ground.

9. A splice assembly as set forth in claim 1, wherein said pair of cable clamping means each includes a first rigid member and a second rigid member; said first rigid member including an opening of a width at least as large as the diameter of the cable; said second rigid member having a raised portion extending therefrom; said first member being secured to said second member with said raised portion aligned with said opening; a portion of the cable adapted to be sandwiched between said first and second member; said raised portion and a portion of the sides of said opening contacting said cable and forming a kink in said cable; said strain relief device adapted to be rigidly coupled to a cable termination device for providing strain relief for the cable.

10. A cable splice assembly comprising:
a splice closure including a container and a top; a portion of said container substantially filled with an oil; a pair of openings in said closure for receiving a pair of cables, each having a jacket and each having at least one conductor per cable adapted to be spliced; said splices being immersed in said oil; a pair of cable clamping means attached to each jacket of said cable, said clamping means including means for applying a kink in each of said cable for insuring that said cable does not slip through said clamp, said cable clamping means being a distance from said splice closure; a pair of rigid integral arms attached respectively to said cable clamping means for transferring forces on one cable directly to the other cable without the force being applied to said splices, said arms further being secured to said splice closure.

* * * * *